(12) United States Patent
Matoba

(10) Patent No.: US 8,496,314 B2
(45) Date of Patent: Jul. 30, 2013

(54) LIQUID EJECTING APPARATUS

(75) Inventor: Kenji Matoba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 329 days.

(21) Appl. No.: 13/039,074

(22) Filed: Mar. 2, 2011

(65) Prior Publication Data

US 2011/0242178 A1 Oct. 6, 2011

(30) Foreign Application Priority Data

Mar. 30, 2010 (JP) ................................. 2010-077756

(51) Int. Cl.
*B41J 29/38* (2006.01)

(52) U.S. Cl.
USPC .......................................................... 347/16

(58) Field of Classification Search
CPC ............... B41J 11/008; B41J 3/60; B41J 29/02
USPC ...................................... 347/16, 19, 101, 104
See application file for complete search history.

(56) References Cited

U.S. PATENT DOCUMENTS

| | | | | |
|---|---|---|---|---|
| 8,061,797 B2 * | 11/2011 | Mizutani | ........................... | 347/16 |
| 8,061,798 B2 * | 11/2011 | Endo et al. | ....................... | 347/16 |
| 8,177,317 B2 * | 5/2012 | Ito et al. | ........................... | 347/16 |

FOREIGN PATENT DOCUMENTS

| | | |
|---|---|---|
| EP | 0693381 A1 | 1/1996 |
| JP | H07-330185 A | 12/1995 |
| JP | H09-156102 A | 6/1997 |
| JP | 2002-144546 A | 5/2002 |
| JP | 2003-237057 A | 8/2003 |
| JP | 2007-237477 A | 9/2007 |

OTHER PUBLICATIONS

Japan Patent Office, Decision to Grant a Patent for Japanese Patent Application No. 2010-077756, dispatched Jun. 5, 2012.

* cited by examiner

*Primary Examiner* — An Do

(74) *Attorney, Agent, or Firm* — Baker Botts L.L.P.

(57) ABSTRACT

Liquid ejecting apparatus including conveyor belt driven by driving device for feeding recording medium on which liquid is ejected by liquid-ejecting head to print image according to stored image data, medium attraction portion disposed in opposition to the conveyor belt and having two electrodes to attract the recording medium to the conveyor belt, variation amount estimating portion to estimate, during printing of the image and on the basis of the stored image data, amount of variation of volume of the liquid to be deposited in subject area of the recording medium which includes a gap-opposition area opposed to gap formed between the two electrodes, and sheet feeding control portion configured to control the driving device to change drive force for driving the conveyor belt, so as to restrict variation of feeding speed of the recording medium by the conveyor belt, during excessive variation period during which the estimated amount of variation of the liquid exceeds upper limit.

15 Claims, 10 Drawing Sheets

LIQUID EJECTING APPARATUS

CROSS REFERENCE TO RELATED APPLICATION

The present application claims the priority from Japanese Patent Application No. 2010-077756 filed Mar. 30, 2010, the disclosure of which is herein incorporated by reference in its entirety.

BACKGROUND OF THE INVENTION

1. Field of the Invention

The present invention relates to a liquid ejecting apparatus configured to eject droplets of a liquid onto a recording medium which is fed by a conveyor belt while it is electrostatically attracted to the conveyor belt.

2. Description of Related Art

An ink-jet printer known as an example of a liquid ejecting apparatus is provided with an endless sheet conveyor belt having a sheet support surface to which a recording medium in the form of a sheet of paper is electrostatically attracted owing to an electrode device disposed within a loop of the endless sheet conveyor belt. The electrode device is covered by an electrode protective film having a low friction coefficient, so that a sliding resistance of the sheet conveyor belt with respect to the electrode protective film is relatively small.

In the known ink-jet printer described above, the electric resistance value of the paper sheet decreases with an increase of the volume of an ink ejected onto the paper sheet being fed, resulting in an increase of a force of electrostatic attraction of the paper sheet to the sheet conveyor belt, and an increase of the sliding resistance of the sheet conveyor belt with respect to the electrode protective film. A manner of control of the rotating speed of the sheet conveyor belt is held unchanged irrespective of a variation of the volume of the ink ejected onto the paper sheet, to prevent an increase of the sliding resistance of the sheet conveyor belt with respect to the electrode protective film. However, the manner of control of the rotating speed of the sheet conveyor belt (the feeding speed of the recording medium), which is not changed following a variation of the sliding resistance of the sheet conveyor belt with respect to the electrode protective film, gives rise to a risk of dislocation of ink dots formed on the paper sheet, from the nominal positions.

SUMMARY OF THE INVENTION

The present invention was made in view of the background art described above. It is therefore an object of the present invention to provide a liquid ejecting apparatus which is configured to reduce a variation or fluctuation of the feeding speed of the recording medium.

The object indicated above can be achieved according to the principle of this invention, which provides a liquid ejecting apparatus comprising: a sheet transfer mechanism including a conveyor belt for feeding a recording medium, and a driving device for driving the conveyor belt, the conveyor belt having a sheet support surface on which the recording medium is placed; at least one liquid-ejecting head configured to eject a liquid onto the recording medium being fed by the conveyor belt; a medium attraction portion disposed in opposition to a surface of the conveyor belt, which surface is opposite to the sheet support surface, and having a first electrode and a second electrode which are spaced apart from each other in a plane parallel to the sheet support surface and to which respective different electric potentials are applied to generate an attraction force for attracting the recording medium to the sheet support surface of the conveyor belt; a memory portion configured to store image data relating to an image to be printed on the recording medium; a variation amount estimating portion configured to estimate, during printing of the image on the recording medium and on the basis of the image data stored in the memory portion, an amount of variation of a volume of the liquid to be deposited in a subject area of the recording medium which includes a gap-opposition area opposed to a gap formed between the first and second electrodes; and a sheet feeding control portion configured to control the driving device, and wherein the sheet feeding control portion changes a drive force for driving the conveyor belt, so as to restrict a variation of a feeding speed of the recording medium by the conveyor belt, during an excessive variation period during which the amount of variation of the volume of the liquid estimated by the variation amount estimating portion exceeds a predetermined upper limit.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which.

DETAILED DESCRIPTION OF THE PREFERRED EMBODIMENTS

The preferred embodiments of this invention will be described by reference to the accompanying drawings.
<First Embodiment>

Figure 1:
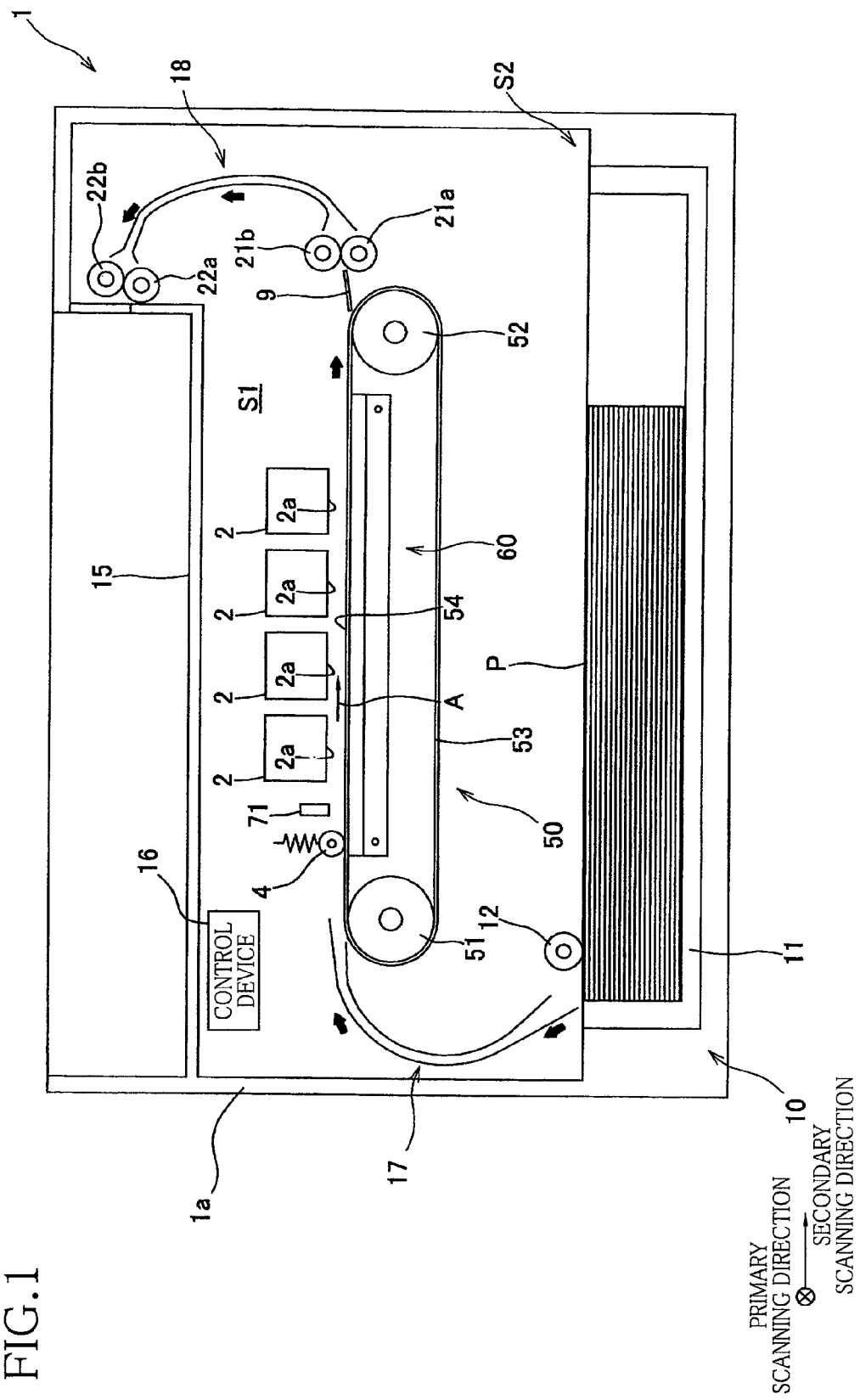
FIG. 1 is a schematic side elevational view of an ink-jet type printer as a liquid-ejecting apparatus constructed according to a first embodiment of this invention.

Referring first to the schematic side elevational view of FIG. 1, there is shown an ink-jet printer 1 constructed as a liquid ejecting apparatus constructed according to a first embodiment of the present invention. The ink-jet printer 1 has a housing 1a in the form of a generally rectangular parallelepiped having an upper wall that serves as a sheet receiver 15. The housing 1a has two functional spaces S1 and S2 arranged such that the functional space S1 is provided below the functional space S1. In the functional space S1, there are disposed an array of liquid-ejecting heads in the form of four ink-jet heads 2, and a sheet transfer mechanism 50, such that the sheet transfer mechanism 50 is located below the array of the ink-jet heads 2. The four ink-jet heads 2 are configured to eject inks of respective four colors, namely, magenta, cyan, yellow and black inks, which have respective different values of electric conductivity. In the functional space S2, there is disposed a sheet supply device 10 configured to accommodate a stack of paper sheets P and supply the paper sheets P one after another. The ink-jet printer 1 further includes a control device 16 for controlling operations of the ink-jet heads 2, sheet transfer mechanism 50 and sheet supply device 10. The direction in which the paper sheet P is fed by the sheet transfer mechanism 50 will be referred to as "a secondary scanning direction", while the direction perpendicular to the secondary scanning direction and parallel to the horizontal direction will be referred to as "a primary scanning direction".

A sheet feeding path is formed through the ink-jet printer 1, for feeding the paper sheet P from the sheet supply device 1 to the sheet receiver 15, as indicated by thick-line arrows in FIG. 1. The sheet supply device 10 includes a sheet supply cassette 1 accommodating the stack of the paper sheets P, a sheet supply roller 12 for supplying the paper sheets P from the sheet supply cassette 11, and a sheet supply motor (not shown) for rotating the sheet supply roller 12.

The sheet supply roller 12 is rotated clockwise as seen in FIG. 1, by the sheet supply motor, to deliver the uppermost one of the paper sheets P stacked in the sheet supply cassette 11. At the left end of the sheet transfer mechanism 50 as seen in FIG. 1, there is disposed a sheet guide 17 extending upwards from the sheet supply cassette 11 so as to define a curved portion of the sheet feeding path. The paper sheet P delivered by the sheet supply roller 12 from the sheet supply cassette 11 is guided by the sheet guide 17 onto an upper span of the loop of an endless sheet conveyor belt 53 of the sheet transfer mechanism 50.

Figure 2:
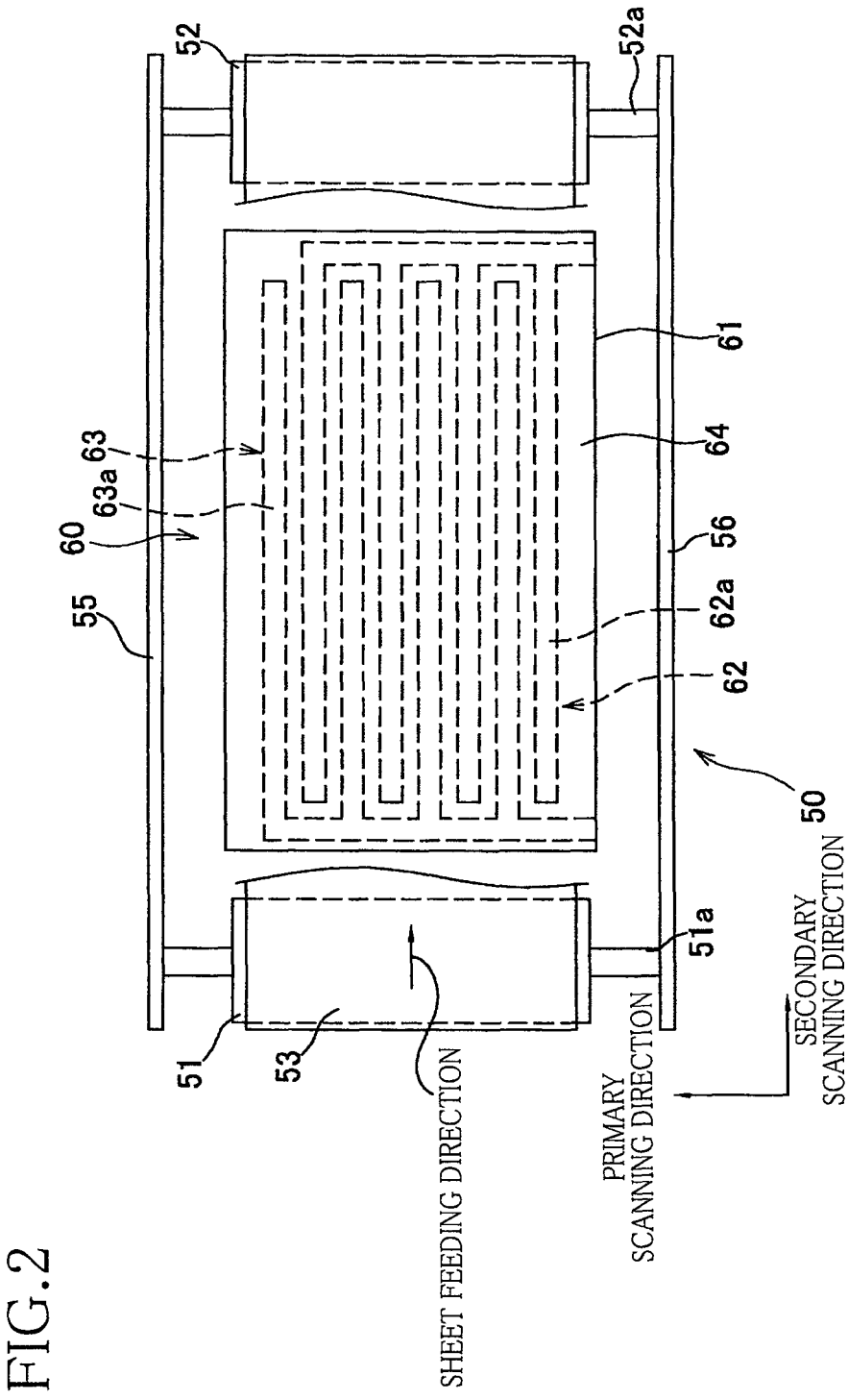
FIG. 2 is a schematic plan view of a sheet feeding mechanism of the printer of FIG. 1.

The sheet transfer mechanism 50 is disposed in opposition to the array of the four ink-jet heads 2, as shown in FIG. 1, and includes: two belt rollers 51, 52; the above-indicated endless sheet conveyor belt 53 connecting the two belt rollers 51, 52; a driving device in the form of a sheet feeding motor M (shown in FIG. 5) for rotating the belt roller 52; a medium attraction portion in the form of a sheet attraction platen 60; and a pair of support plates 55, 56 supporting the belt rollers 51, 52, as shown in FIG. 2. The two belt rollers 55, 56 are spaced apart from each other in the sheet feeding direction (secondary scanning direction) and rotatably supported by the two support plates 55, 56 via respective shafts 51a, 52a.

The sheet conveyor belt 53 is formed of a polyimide or fluororesin material, for example, and has a volume resistivity value of about $10^8$-$10^{14}$ ωcm, and a suitable value of flexibility. However, the sheet conveyor belts may be formed of any other material having the above-indicated volume resistivity and flexibility values.

As shown in FIG. 2, the sheet attraction platen 60 includes a planar base member 61 formed of an electrically insulating material, two electrodes 62, 63 bonded to an upper surface 61a of the base member 61, and a protective film 64 bonded to the upper surface 61 so as to entirely cover the two electrodes 62, 63. The base member 61 and the protective film 64 have the same planar shape as the paper sheet P having the maximum size (A4 size in the present embodiment) that can be printed by the present ink-jet printer 1. Each of the two electrodes 62, 63 has a plurality of elongate portions 62a, 63a extending to pass the four ink-jet heads 2 in the sheet feeding direction (secondary scanning direction). The two electrodes 62, 63 take the form of comb-like members wherein the first elongate members 62a of the first electrode 62 and the second elongate portions 63a of the second electrode 63 are arranged alternately in the main scanning direction and are spaced apart from each other in the secondary scanning direction. The two electrodes 62, 63 are opposed to a surface of the sheet conveyor belt 53, which surface is opposite to a sheet support surface 54 (shown in FIG. 1) of the sheet conveyor belt 53, and the elongate members 62a, 63a are spaced apart from each other in a plane parallel to the sheet support surface 54, in the main scanning direction. The electrodes 62, 63 are electrically connected to a power source provided within the housing 1a. The protective film 64 is formed of a polyimide or fluororesin material, and has a volume resistivity value of about $10^8$-$10^{14}$ Ωcm. However, the protective film 64 may be formed of any other material having the above-indicated volume resistivity A nip roller 4 is disposed in opposition to end parts of the elongate portions 62a, 63a of the electrodes 62a, 63a in an upstream end portion of the sheet attraction platen 60, as viewed in the sheet feeding direction. The nip roller 4 is provided to press the paper sheet P delivered from the sheet supply device 10, onto the sheet support surface 54 of the sheet conveyor belt 53. A sheet sensor 71 is disposed at a position slightly spaced apart from the nip roller 4 in the downstream direction, to detect the passage of the paper sheet P pressed onto the sheet support surface 54, past and below the sheet sensor 71.

In the arrangement of the sheet transfer mechanism 50 constructed as described above, a clockwise rotary motion of the belt roller 52 causes a rotary motion of the endless sheet conveyor belt 53, and consequent rotary motions of the belt roller 51 and nip roller 4.

During the rotation of the sheet conveyor belt 53, different electric potentials are applied to the two electrodes 62, 63, namely, a positive or negative potential is applied to the electrode 62 while a ground potential is applied to the electrode 63. When a voltage is thus applied between the two electrodes 62, 63, the various members described above and gaps formed therebetween are electrically charged so as to form a capacitor, which is charged with a small amount of electric current flowing through a gap between the paper sheet P and the sheet conveyor belt 53, whereby an electric field is generated in the gap, so that a Johnsen-Rahbeck force is generated as an electrostatic attraction force between the paper sheet P and the sheet conveyor belt 53. The paper sheet P is electrostatically attracted with this electrostatic attraction force to the sheet support surface 54 of the sheet conveyor belt 53. As the volume (amount) of the ink ejected on the paper sheet P increases while the paper sheet P is fed, the electric resistance value of the paper sheet P decreases, with a result of an increase of the amount of electric current flowing through the capacitor, causing the various members and gaps to be more likely to be electrically charged, and an increase of the electrostatic attraction force of the sheet attraction platen 60 with respect to the paper sheet P.

Thus, the paper sheet P delivered from the sheet supply device 10 is fed in the secondary scanning direction while the paper sheet P is electrostatically attracted to the sheet support surface 54 with the electrostatic attraction force generated by the sheet attraction platen 60. While the paper sheet P thus electrostatically attracted to the sheet support surface 54 of the sheet conveyor belt 53 is fed right under the ink-jet heads 2 one after another, the droplets of the inks of different colors are ejected from the respective ink-jet heads 2, onto the paper sheet P, whereby a color image is formed on the paper sheet P.

Referring back to FIG. 1, a sheet separator member 9 is disposed at a position slightly spaced apart from the sheet transfer mechanism 50 in the downstream direction, to separate the paper sheet P from the sheet support surface 54, with its leading edge being inserted between the paper sheet P and the sheet support surface 54. In an end portion of the sheet attraction plate 60 near the belt roller 52 is so small that the leading end portion of the paper sheet P arriving at the sheet separator member 9 can be easily separated by the sheet separator member 9 from the sheet support surface 54.

At opposite ends of a curved portion of the sheet feeding path between the sheet transfer mechanism 50 and the sheet receiver 15, a pair of feed rollers 21a, 21b and a pair of feed rollers 22a, 22b are respectively disposed. A sheet guide 18 is provided so as to define the curved portion of the sheet feeding path between the two pairs of feed rollers 21a, 21b, 22a, 22b. The feed rollers 21b, 22b are rotated by a feed motor (not shown), to feed the paper sheet P upwards as seen in FIG. 1 from the sheet transfer mechanism 50 while the paper sheet P is nipped between the feed rollers 21a, 21b, and to feed the paper sheet P onto the sheet receiver 15 while the paper sheet P is nipped between the feed rollers 22a, 22b. The feed rollers 21a, 22a are driven rollers driven by the feed rollers 21b, 22b while the paper sheet P is fed.

Figure 3:
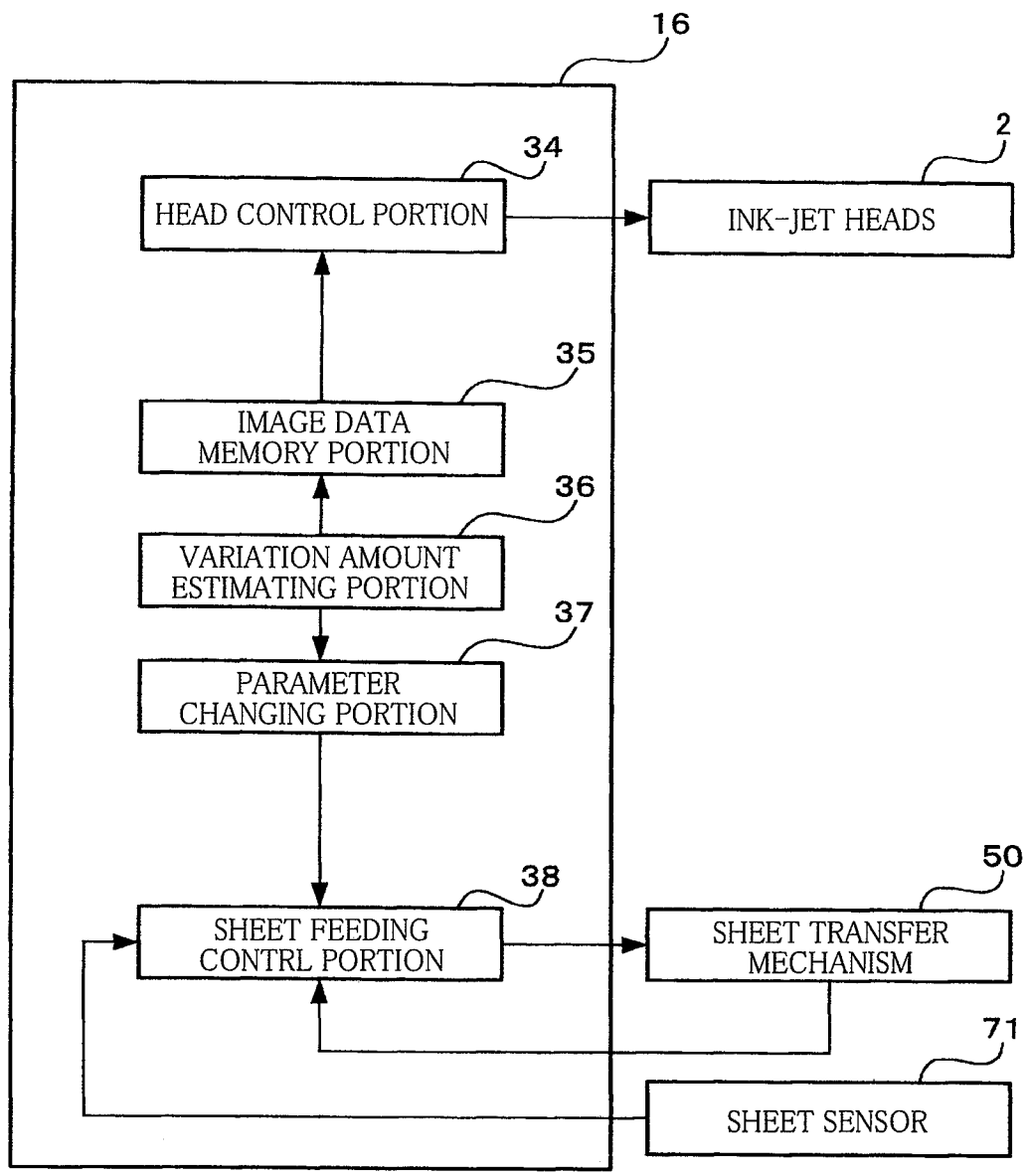
FIG. 3 is a functional block diagram showing a control device of the printer of FIG. 1.

The control device 16 will then be described. The control device 16 incorporates a CPU (central processing unit), an EEPROM (electrically erasable and programmable read-only memory) storing programs executed by the CPU and data used for the programs, and a RAM (random access memory) for temporarily storing data during execution of the programs. These hardware devices cooperate with software within the EEPROM to constitute various functional portions of the control device 16. As shown in FIG. 3, the control device 16 includes a head control portion 34, an image data memory portion 35, a variation amount estimating portion 36, a parameter changing portion 37 and a sheet feeding control portion 38.

The image data memory portion 35 stores image data according to which an image is printed on the paper sheet. The image data represent one of four ink concentration values corresponding to respective different volumes of ink droplets (no ink dot, small ink dot, medium ink dot and large ink dot), for each of picture elements arranged in a matrix in the primary and secondary scanning directions.

The head control portion 34 is configured to control the ink-jet heads 2 to print the image on the paper sheet P according to the image data stored in the image data memory portion 35.

Figure 4:
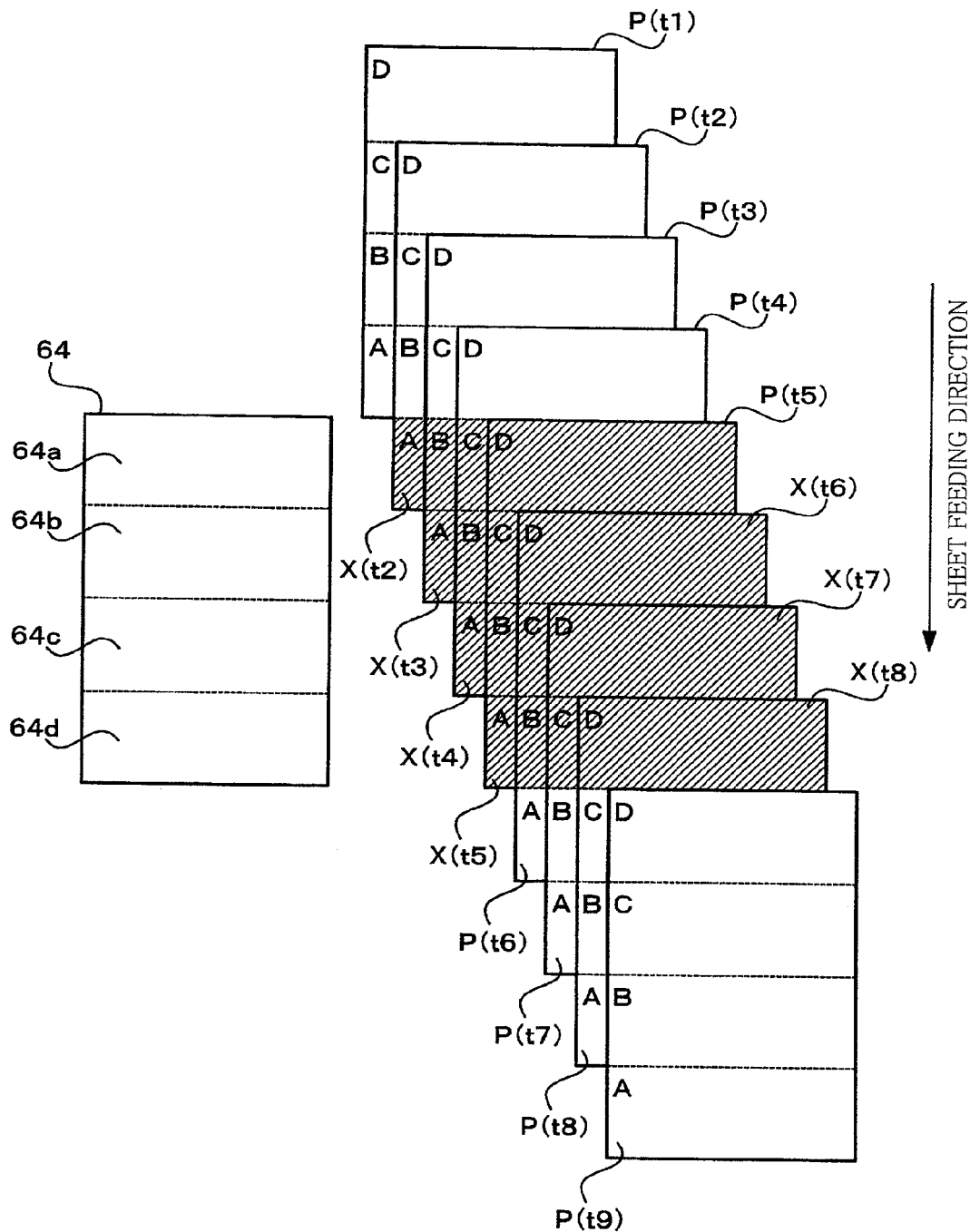
FIG. 4 is a view for explaining a function of a variation amount estimating portion of the control device of FIG. 3.

The variation amount estimating portion 36 is configured to estimate, on the basis of the image data stored in the image data memory portion 35, an amount of variation of the volume of the ink to be deposited in a subject area X of the paper sheet P opposed to the protective film 64 (covering the electrodes 62, 63), at estimated points of time t1-t8 during an operation of printing of the image on the paper sheet P according to the image data, as indicated in FIG. 4. The points of time t1-t9 indicated in FIG. 4 are defined with respect to a reference moment of time at which the passage of the paper sheet P is detected by the sheet sensor 71. At the points of time t1-t9, the leading edge of each of four equal divisions A-D of the paper sheet P successively arranged in the feeding direction (hereinafter referred to as "sheet feeding direction") as indicated in FIG. 4 reaches the upstream edge of the protective film 64 as seen in the sheet feeding direction (the upper edge of the protective film 64 as seen in FIG. 4), or the trailing edge of each equal division A-D reaches the downstream edge (lower edge) of the protective film 64. The four divisions A, B, C and D have the same dimension in the sheet feeding direction, and are arranged in the order of description such that the division A leads the other divisions B-D as seen in the sheet feeding direction, as shown in FIG. 4.

The term "subject area X" is an area of the paper sheet P in a horizontal plane, which includes at least a gap-opposition area Y (which will be described by reference to FIG. 9) which is opposed to a gap formed between the two (first and second) electrodes 62, 63 in the horizontal plane (in the primary and secondary scanning directions). The subject area X of the paper sheet P is used by the variation amount estimating portion 36 to estimate the amount of variation of the volume of the ink. In this first embodiment, the subject area X has the size as the protective film 64. However, the subject area X need not be opposed to the entire surface area of the protective film 64 as in the specific example of FIG. 4, as long as the subject area X includes the above-indicated gap-opposition area Y. The subject area X may be smaller or larger than the surface area of the protective film 64. The subject area X of the paper sheet P increases and decreases as the paper sheet P is fed in the secondary scanning direction.

At the points of time t1 and t9, none of the divisions A-D constitutes the subject area X. At the point of time t2, only the division A constitutes the subject area X. At the point of time t3, the two divisions A and B constitute the subject area X. At the point of time t4, the three divisions A-C constitute the subject area X. At the point of time t5, all of the four divisions A-D constitute the subject area X. At the point of time t6, the three divisions B-D constitute the subject area X. At the point of time t7, the two divisions C and D constitute the subject area X. At the point of time t8, only the division D constitutes the subject area X. At the point of time t5, the divisions A, B, C and D of the paper sheet P are opposed to respective four equal divisions 64d, 64c, 64c and 64a of the protective film 64 in the secondary scanning direction, and therefore all of the four divisions A-D constitute the subject area X, as is apparent from FIG. 4.

Thus, the variation amount estimating portion 36 is configured to set the points of time t1-t9 such that different numbers of the divisions A-D exist in the opposition area X and serve as the subject area of the paper sheet P at the two successive points of time "tn" and "t(n+1), for example, at the two successive points of time t1 and t2.

The variation amount estimating portion 36 estimates or calculates the volume of the ink to be deposited in each of the divisions A-D constituting the subject area X, at each of the estimated points of time t1-t9, for each of the magenta, cyan, yellow and black inks, and a total volume of the ink in at least one of the four divisions A-D constituting the subject area X, for each of the four colors of ink. The variation amount estimating portion 36 calculates an amount of variation of the volume of the ink of each color to be deposited on the paper sheet P during each time period from the point of time tn to the point of time t(n+1), for instance, during the time period from the point of time t1 to the point of time t2, by subtracting the total volume of the ink at the point of time tn from that at the next point of time t(n+1). This amount of variation is calculated for all of the time periods, beginning with the time period from the point of time t1 to the point of time t2, up to the time period from the point of time t8 to the point of time t9. Each of the calculated amounts of variation for each of the four colors of ink is multiplied by the electric conductivity value of the ink of the color in question, to eventually calculate an amount of variation of the volume of the ink of each color during each period of time. The variation amount estimating portion 36 calculates a sum of the thus calculated amounts of variation of the volumes of the four colors of ink for each time period.

Figure 5:
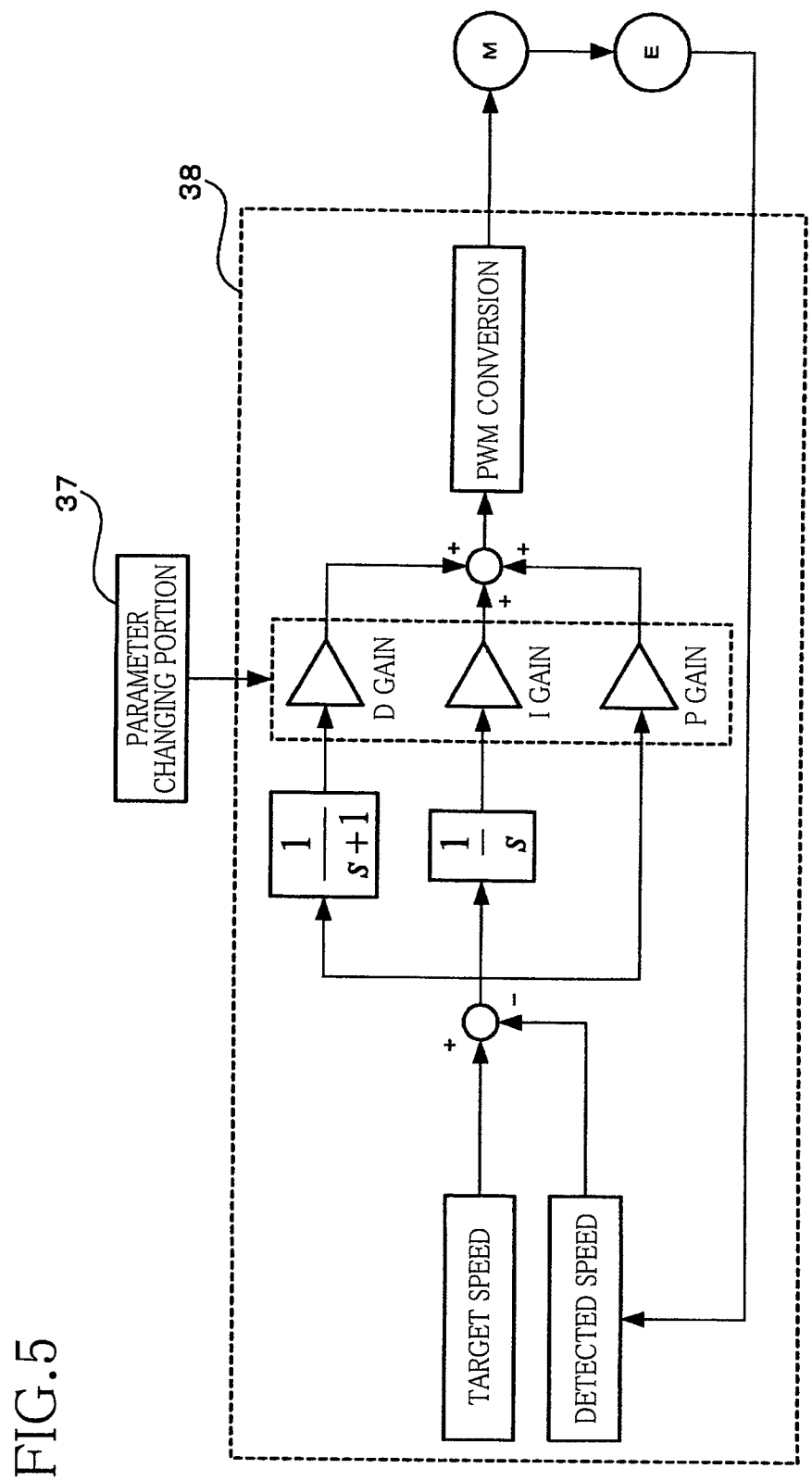
FIG. 5 is a block diagram showing a sheet feeding control portion of the control device of FIG. 3.

The sheet feeding control portion 38 is configured to control the sheet feeding motor M of the sheet transfer mechanism 50, as shown in FIG. 5. The sheet feeding control portion 38 calculates an amount of control error of the feeding speed of the paper sheet P by subtracting an actual speed obtained on the basis of an output of an encoder E provided to detect the actual operating speed of the sheet feeding motor M, from a predetermined target value, and generates a speed control value which is a sum of a value obtained by multiplying the calculated amount of control error by a P gain (proportional gain); a value obtained by multiplying a differential value (1/S) of the calculated amount of control error by an I gain (integral gain); and a value obtained by multiplying an integral value (1/(S+1)) of the calculated amount of control error by a D gain (differential gain). The sheet feeding control portion 38 converts the generated speed control value into a PWM (pulse width modulation) signal to be applied to the sheet feeding motor M. Thus, the sheet feeding control portion 38 performs a PID control of the sheet feeding motor M.

The parameter changing portion 37 is configured to change the P, I and D gains which are control parameters of the sheet feeding control portion 38, on the basis of the final amounts of variation of the volume of the ink calculated by the variation amount estimating portion 36 for each of the above-indicated time periods from the point of time tn to the point of time t(n+1). As previously described, the electrostatic attraction force by which the paper sheet P is electrostatically attracted to the sheet attraction platen 60 increases with an increase of the total volume of the ink to be deposited in the subject area X of the paper sheet P, so that the sliding resistance between the inner surface (lower surface of the upper span) of the conveyor belt 53 and the protective film 64 increases with the increase of the ink volume, whereby the speed of feeding of the paper sheet P by the conveyor belt 53 may undesirably fluctuate.

Figure 6:
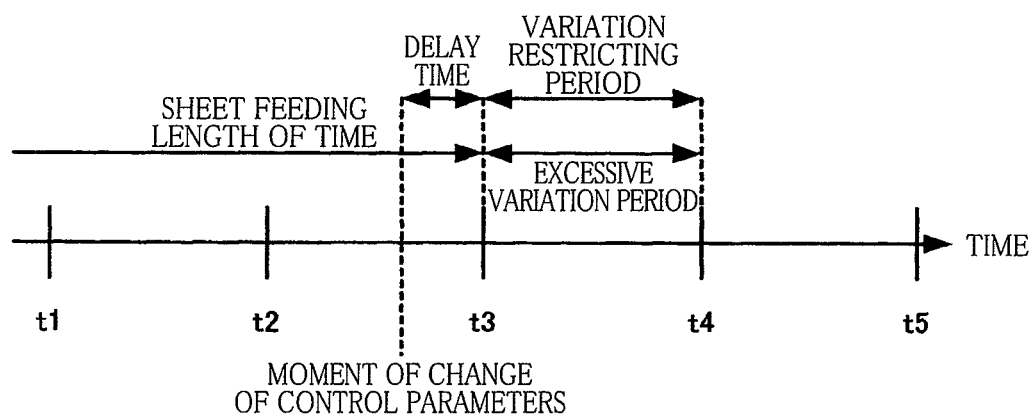
FIG. 6 is a time chart indicating an operation of a parameter changing portion of the control device of FIG. 3

The parameter changing portion 37 is configured to determine a start point of the time period during which the final amount of variation of the volume of the ink estimated by the variation amount estimating portion 36 exceeds a predetermined upper limit. The parameter changing portion increases the upper limit with an increase of the length of time which has passed after the moment of initiation of ejection of the ink droplets from the ink-jet heads 2. In the specific example of FIG. 6 wherein the final amount of variation of the volume of the ink exceeds the upper limit during the time period ("excessive variation period") from the start point of time t3 to the next point of time t4, the parameter changing portion 37 calculates the P, I and D gains such that the calculated gains restrict the amount of variation of the rotating speed of the conveyor belt 53 (feeding speed of the paper sheet P) during the excessive variation period as a variation restricting period. This calculation takes place for any excessive variation period from the start point of time tn to the next point of time t(n+1). Described in detail, the parameter changing portion 37 calculates the control parameters of the sheet feeding control portion 38 in the form of the P, I and D gains such that a second derivative of the time relating to the drive force for driving the conveyor belt 53 increases with an increase of the final amount of variation of the volume of the ink estimated by the variation amount estimating portion 36, beyond the upper limit, during the given excessive variation period tn–t(n+1).

During the printing operation of the ink-jet heads 2, the parameter changing portion 37 changes the present P, I and D gains of the sheet feeding control portion 38 to the calculated values at a moment of time (also indicated in FIG. 6) which is prior to the start point of time (e.g., t3) of the excessive variation period (e.g., t3-t4) by a predetermined delay time. This delay time is a length of time from the moment of change of the control parameters, which length of time is required for assuring desired stability of the rotating speed of the conveyor belt 53 (the feeding speed of the paper sheet P) with the changed control parameters. Namely, the delay time is a time of delay of the response of the sheet transfer mechanism 50 to a change of the control parameters.

Figure 7:
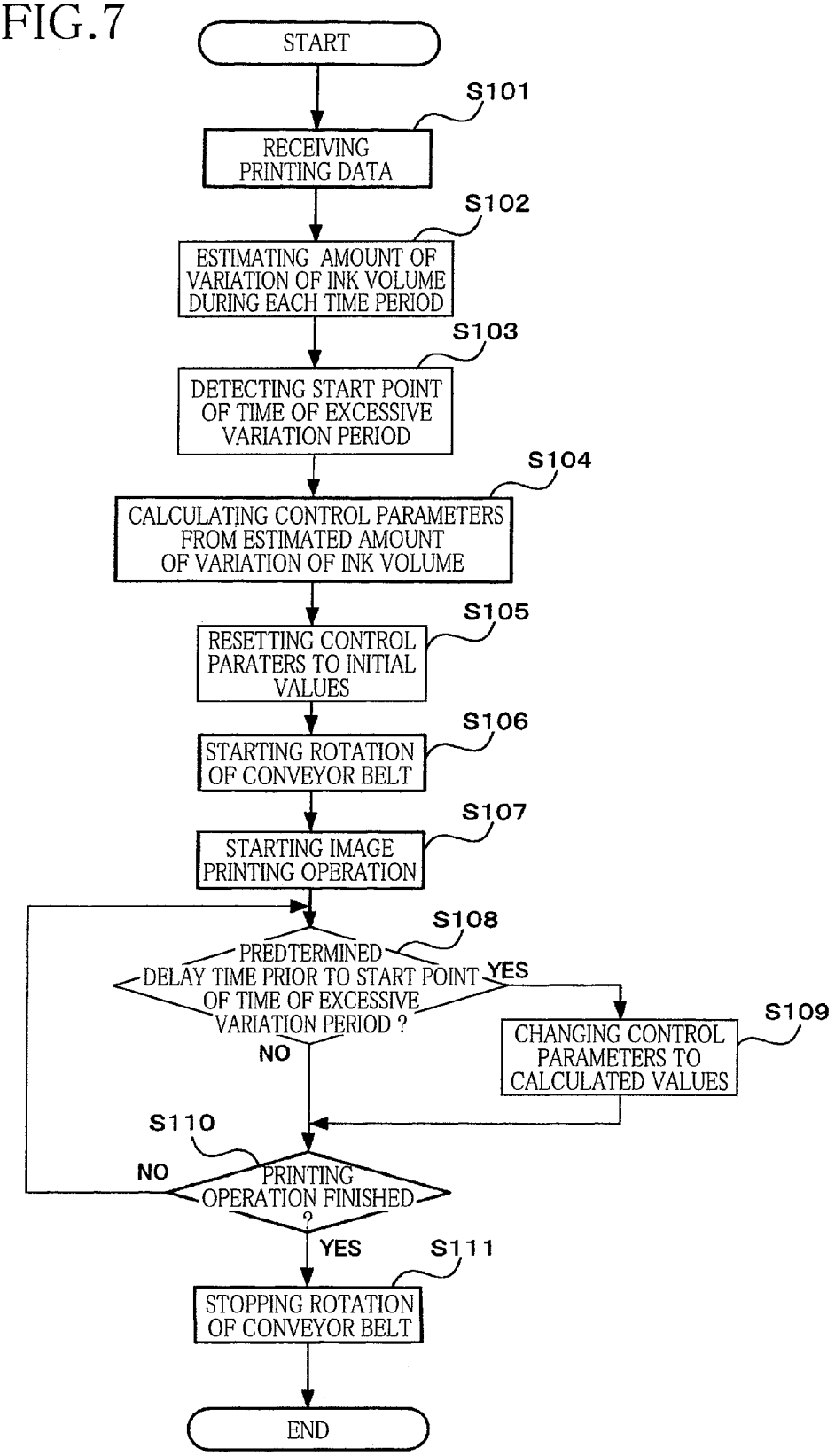
FIG. 7 is a flow chart illustrating a control routine executed by the control device of the ink-jet printer of FIG. 1.

Then, the printing operation of the ink-jet printer 1 will be described, referring to a flow chart of FIG. 7 illustrating a control routine executed by the control device 16. The ink-jet printer 1 receives in step S101 printing data including a printing command and the image data, from an external computer, when the ink-jet printer 1 is placed in a standby state. The received image data are stored in the image data memory portion 35. Then, in step S102, the variation amount estimating portion 36 estimates, on the basis of the image data, the amount of variation of the volume of the ink to be deposited in the subject area X of the paper sheet P, during each time period from the estimated point of time tn to the next estimated point of time t(n+1).

The parameter changing portion 37 determines in step S103 the start point tn of each excessive variation period during which the final amount of variation of the volume of the ink estimated by the variation amount estimating portion 36 exceeds the upper limit, and calculates in step S104 the P, I and D gains that restrict the amount of variation of the speed of feeding of the paper sheet P by the conveyor belt 53 during each excessive variation period in question.

The sheet feeding control portion 38 resets the P, I and D gains to predetermined initial values in step S105. The initial values of the P, I and D gains are determined so as to permit the paper sheet P to be fed at the desired speed while no inks are deposited on the paper sheet P. In step S106, the sheet feeding control portion 38 starts the sheet feeding motor M to start the rotary motion of the endless conveyor belt 53. The sheet feeding control portion 38 also drives the sheet supply roller 12 to supply the uppermost paper sheet P from the sheet supply cassette 11. The paper sheet P is then fed along the sheet guide 17 onto the conveyor belt 53. When the paper sheet P fed by the conveyor belt 53 is detected by the sheet sensor 71, the image printing operation on the paper sheet P is initiated in step S107.

The parameter changing portion 37 determines in step S108 whether the time which has passed after the moment of detection of the paper sheet P by the sheet sensor 71 has become equal to the predetermined delay time prior to the start point of time of any excessive variation period during which the estimated amount of variation of the volume of the ink exceeds the upper limit. If a negative determination (NO) is obtained in step S108, the parameter changing portion 37 determines in step S109 whether the printing operation on the paper sheet P is finished. If an affirmative determination (YES) is obtained in step S108, the parameter changing portion 37 changes the present P, I and D gains to the values already calculated for the excessive variation period in question (for the variation restricting period). Then, the parameter changing portion 37 implements the step S110 to determine whether the printing operation is finished. The above-indicated steps S108-S110 are repeatedly implemented until an affirmative determination (YES) is obtained in the step S110. If the affirmative determination is obtained in the step S110, the sheet feeding control portion 38 stops the sheet feeding motor M in step S111. The control routine is terminated with the step S111.

As described, the ink-jet printer 1 according to the present embodiment is constructed to restrict the amount of variation of the feeding speed of the paper sheet P as a result of an abrupt increase of the drive force required to drive the conveyor belt 53 due to an increase of the amount of variation of the volume of the ink deposited on the paper sheet P.

Further, the change of the control parameters by the parameter changing portion 37 at a moment of time which is prior to the start point of the excessive variation period by the predetermined delay time can deal with a mechanical delayed response of the sheet transfer mechanism 50 to the change of the control parameters, so as to further restrict the variation or fluctuation of the feeding speed of the paper sheet P.

In addition, the parameter changing portion 37 is configured to calculate the P, I and D gains as the control parameters of the sheet feeding control portion 28 such that the second derivative of the time relating to the drive force of the sheet feeding motor M for driving the conveyor belt 53 increases with an increase of the amount of variation of the volume of the ink to be deposited on the paper sheet P during the excessive variation period, which amount is estimated by the variation amount estimating portion 36. Thus, it is possible to efficiently restrict the variation or fluctuation of the feeding speed of the paper sheet P.

It is also noted that the variation amount estimating portion 36 is configured to estimate the amount of variation of the volume of the liquid to be deposited in each of the plurality of equal divisions A-D of the paper sheet P successively arranged in the direction of feeding of the paper sheet P by the conveyor belt 53. Thus, the amount of variation of the volume of the ink can be easily estimated.

Further, the variation amount estimating portion is further configured to estimate a sum of the amounts of variation of the volumes of the inks of the four colors multiplied by the respective values of the electric conductivity of the inks, for each time period from the point of time tn to the next point of time t(n+1). Accordingly, the amount of variation of the force of attraction of the sheet attraction platen 60 to attract the paper sheet P to the conveyor belt 53 can be accurately estimated.

It is further noted that the sheet feeding control portion 38 is configured to performs the PID control of the sheet feeding motor M, and the parameter changing portion 38 is configured to change the P, I and D gains as the control parameters of the PID control to change the drive force of the sheet feeding motor M for driving the conveyor belt 53, whereby the feeding speed of the paper sheet P can be easily controlled to the target value.

Further, the parameter changing portion 37 is configured to increase the upper limit used to detect each excessive variation period, with an increase of the length of time which has passed after the moment of initiation of ejection of the ink droplets from the ink-jet heads 2. Namely, the upper limit is increased as the drying of the ink droplets deposited on the paper sheet P progresses, so that only the amount of variation or fluctuation of the feeding speed of the paper sheet P can be efficiently restricted.

In addition, the first and second electrodes 62, 63 have the respective first and second elongate portions 62a, 63a extending to pass the four ink-jet heads 2 in the feeding direction of the paper sheet P (in the secondary scanning direction), and the electrodes 62, 63 take the form of the comb-like members wherein the first and second elongate portions 62a, 63a are alternately arranged in the primary scanning direction.

<Second Embodiment>

Figure 8:
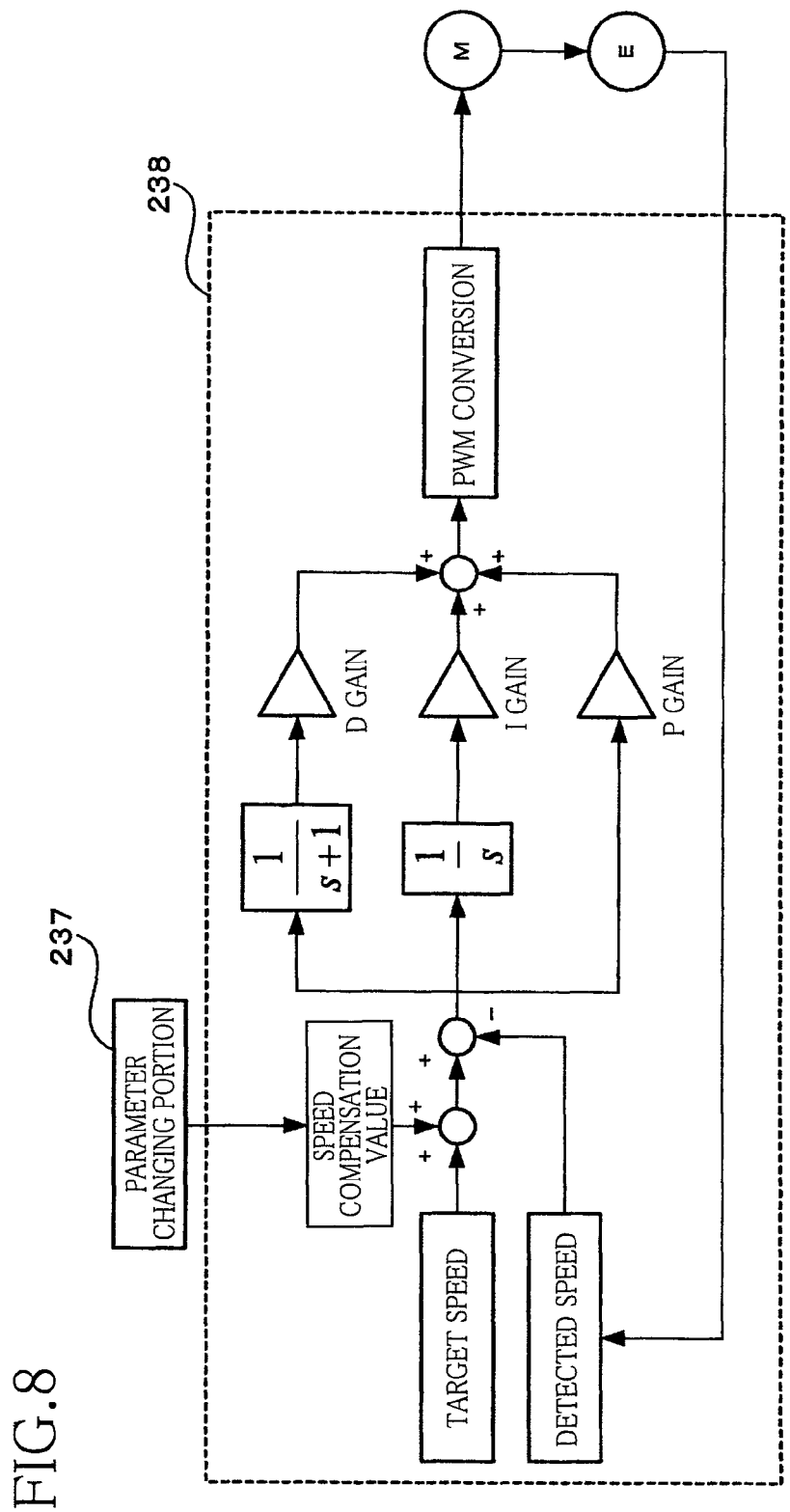
FIG. 8 is a block diagram corresponding to that of FIG. 5, showing a second embodiment of this invention.

Referring next to FIG. 8, a second embodiment of the present invention will be described. In this second embodiment, the control device 16 includes a parameter changing portion 237, and a sheet feeding control portion 238 configured to calculate the amount of speed control error by subtracting the actual speed obtained on the basis of the output of the encoder E (provided to detect the actual operating speed of the sheet feeding motor M), from the predetermined target value of the feeding speed of the paper sheet. P as compensated by a speed compensation value, and to generate the speed control value which is a sum of: the value obtained by multiplying the calculated amount of speed control error by the P gain; the value obtained by multiplying the differential value (1/s) of the calculated amount of speed control error by the I gain; and the value obtained by multiplying the integral value (1/(S+1)) of the calculated amount of speed control error by the D gain. The sheet feeding control portion 238 converts the generated speed control value into the PWM signal to be applied to the sheet feeding motor M. The parameter changing portion 237 calculates an amount of variation of the rotating speed of the sheet conveyor belt 53 as the speed compensation value during each excessive variation period during which the estimated final amount of variation of the volume of the ink exceeds the upper limit, and uses the thus calculated speed compensation value as a control parameter for the feed-forward control of the sheet feeding motor M.

The second embodiment described above permits an improved response to the target value of the sheet feeding speed. The parameter changing portion 237 may be modified to not only calculate the speed compensation value, but also change the P, I and D gains as in the first embodiment.

<Third Embodiment>

A third embodiment of this invention will be described. In the first and second embodiments described above, the variation amount estimating portion 36 is configured to estimate the amount of variation of the volume of the ink to be deposited in the subject area X of the paper sheet P opposed to the entire surface area of the protective film 64. In this third embodiment, the variation amount changing portion 36 is configured to estimate the amount of variation of the volume of the ink to be deposited in the subject area X of the paper sheet P, which is constituted by only the previously indicated gap-opposition area Y opposed to the gap formed between the two electrodes 62, 63.

Figure 9:
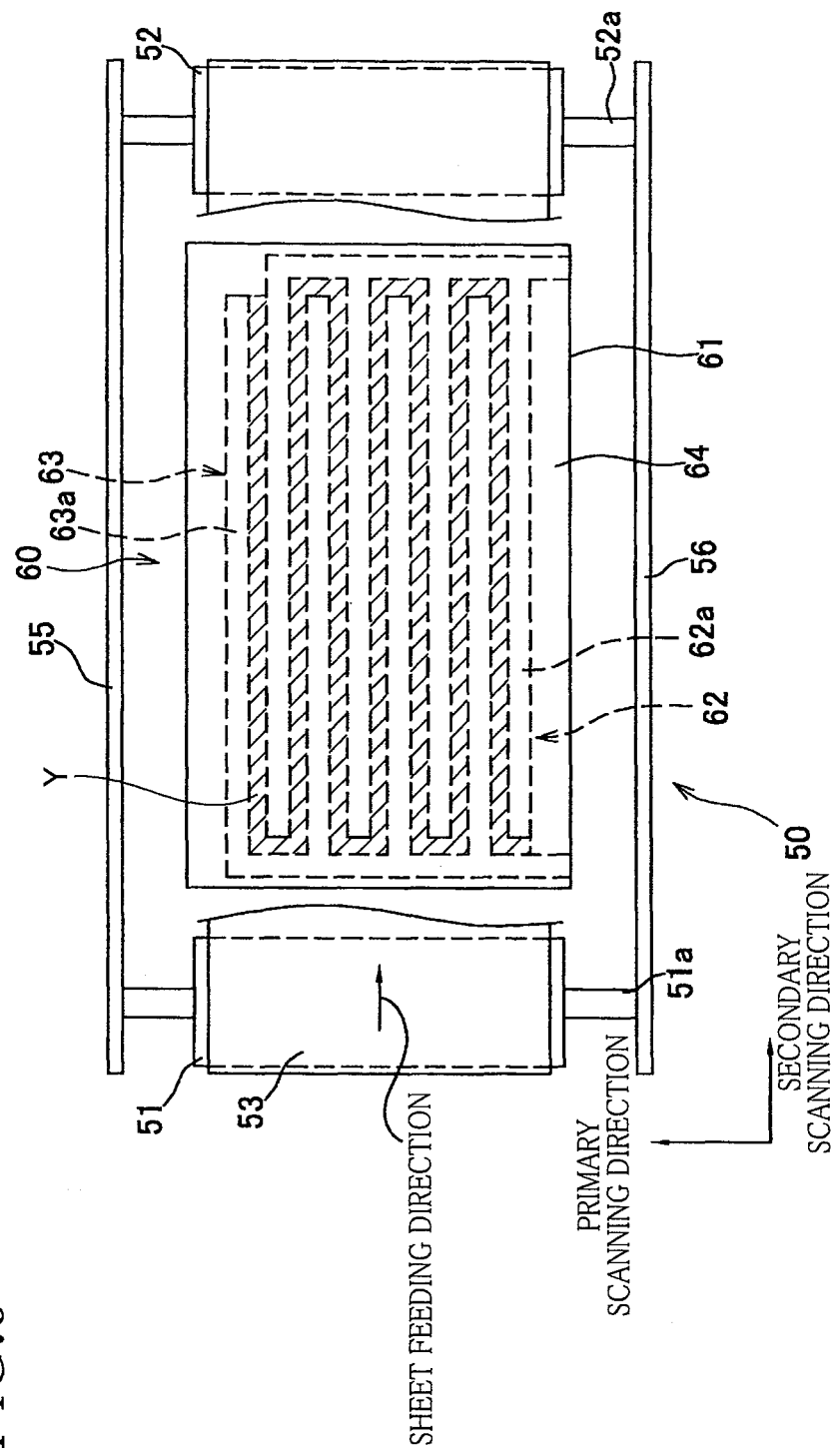
FIG. 9 is a schematic view for explaining a gap-opposition area Y in connection with the variation amount estimating portion in a third embodiment of the invention.

The gap-opposition area Y will be described in detail, referring to FIG. 9, which is a plan view as seen downwards in the vertical direction (that is perpendicular to the primary and secondary scanning directions) toward the paper sheet P placed on the upper span of the sheet conveyor belt 53, when the paper sheet P faces the first and second electrodes 62, 63 (bonded to the base member 61 of the sheet attraction platen 60). The gap-opposition area Y is also an imaginary area which is opposed to the gap formed between the first and second electrodes 62, 63 in the horizontal plane (in the primary and secondary scanning directions). The gap-opposition area Y opposed to the above-described gap consists of a plurality of relatively long portions extending in the secondary scanning direction, and a plurality of relatively short portions connecting the relatively long portions and extending in the primary scanning direction. As previously described, the Johnsen-Rahbeck force is generated between the paper sheet P and the platen 60, as a result of formation of the capacitor in the gap between the paper sheet P and the two electrodes 62, 63. The amount of the electric current flowing through this capacitor depends on the volume of the ink to be deposited on the paper sheet P. The area of the paper sheet P which influences the amount of the electric current between the paper sheet P and the electrodes 62, 63 is the subject area existing in the gap-opposition area Y (indicated in FIG. 9) in which a relatively small amount of electric current flows between the first and second electrodes 62, 63.

The Jonsen-Rahbeck force generated between the sheet conveyor belt 53 and the sheet attraction platen 60 is not changed by the volume of the ink to be deposited in the areas of the paper sheet P other than the area existing in the gap-opposition area Y. The third embodiment described above makes it possible to accurately obtain only the amount of variation of the volume of the ink which influences the feeding speed of the paper sheet P (the rotating speed of the sheet conveyor belt 53), and therefore to more adequately change the control parameters of the sheet feeding portion 38, 238, assuring more effective restriction or prevention of the fluctuation or variation of the sheet feeding speed.

<Fourth Embodiment>

A fourth embodiment of this invention will be described. The ink-jet printer according to this fourth embodiment includes a reversing mechanism configured to turn upside down the paper sheet P after an image has been printed on one of the opposite surfaces of the paper sheet P, and place the paper sheet P again on the upper span of the sheet conveyor belt 53 of the sheet transfer mechanism 50 so that an image can be printed on the other surface of the paper sheet P. In this embodiment, the variation amount estimating portion is configured to estimate the amount of variation of the volume of the ink, for only the above-indicated one surface of the paper sheet P where the image is printed on only this surface, and for both of the opposite surfaces of the paper sheet P where the images are printed on the other of the opposite surfaces. The image data for the image previously printed on the above-indicated one surface of the paper sheet P remains in the image data memory portion 35 when the variation amount estimating portion estimates the amount of variation of the volume of the ink to be deposited on the opposite surfaces of the paper sheet P.

The fourth embodiment makes it possible to restrict or prevent the amount of variation of the feeding speed of the paper sheet P even where the images are printed on the opposite surfaces of the paper sheet P.

<Fifth Embodiment>

Figure 10:
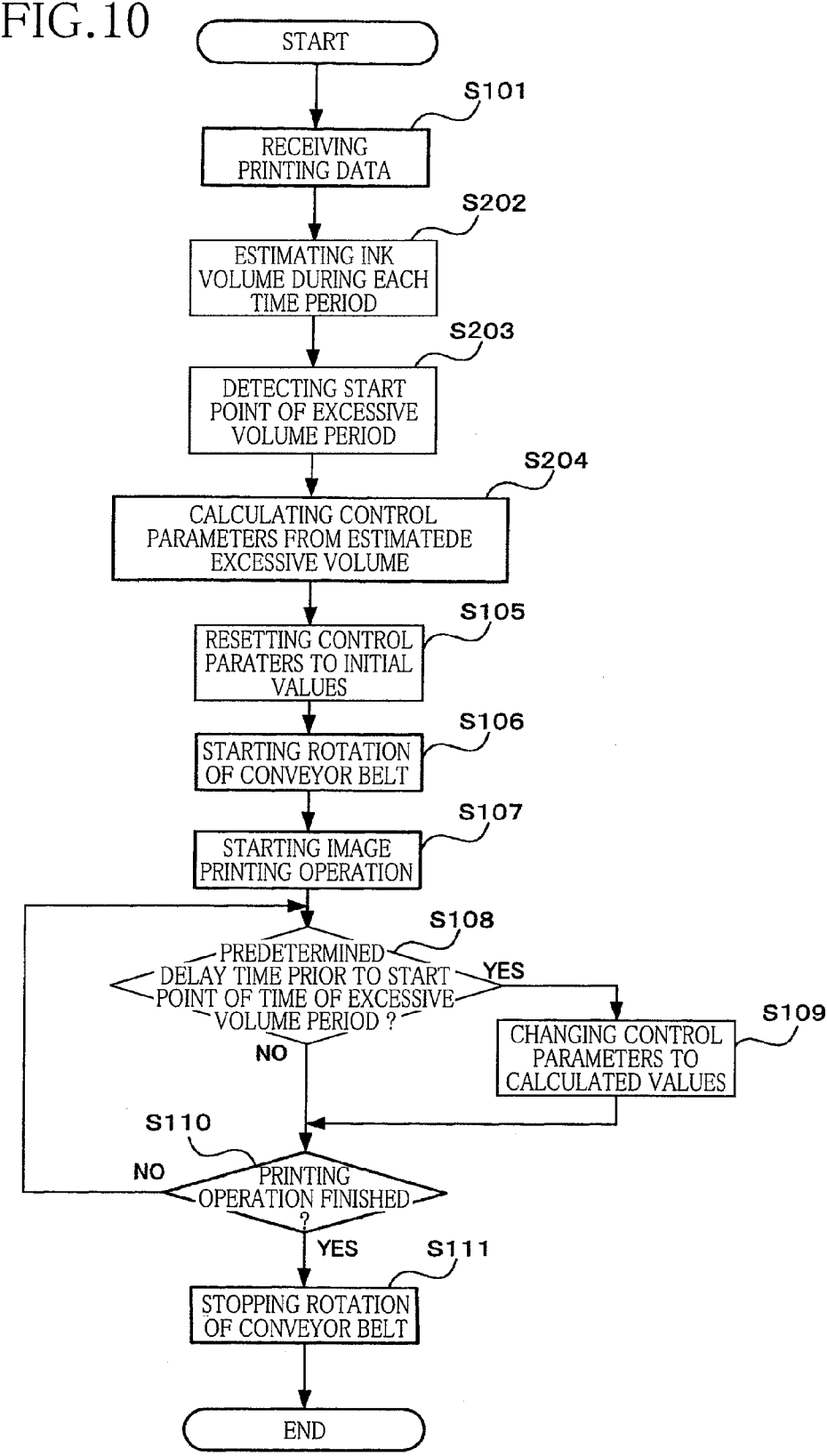
FIG. 10 is a flow chart corresponding to that of FIG. 7, showing a fifth embodiment of this invention.

A fifth embodiment of the present invention will be described by reference to FIG. 10. In the fifth embodiment, a control routine illustrated in the flow chart of FIG. 10 is executed. In this control routine, step S101 is followed by step 202 wherein a volume estimating portion estimates the volume of the ink to be deposited in the subject area X, not the amount of variation of the volume of the ink, for each time period from the point of time tn to the next point of tine t(n+1). The step S202 is followed by step S203 to detect the start point of an excessive volume period during which the estimated volume of the ink exceeds an upper limit predetermined for each of the time periods. Then, the control flow goes to step S204 to calculate the control parameters on the basis of the estimated volume of the ink during the excessive volume period. As indicated in FIG. 4, the volume of the ink deposited at the estimated point of time t1 is zero. The volume of the ink deposited in the subject area X of the paper sheet P at the estimated point of time t2 can be estimated on the basis of the image data. Thus, the present embodiment is configured to permit the estimation of an amount of variation of the drive force required to rotate the conveyor belt 53 at each estimated point of time t, with respect to the value of the drive force at the point of time t1, by obtaining the volume of the ink deposited in the subject area X of the paper sheet P at each estimated point of time t.

The fifth embodiment makes it possible to restrict or prevent the amount of variation of the feeding speed of the paper sheet P even where the drive force required to drive the sheet conveyor belt 53 increases due to an increase of the volume of the ink to be deposited on the paper sheet P.

While the preferred embodiments of the present invention have been described above by reference to the drawings, for illustrative purpose only, it is to be understood that the present invention is not limited to the details of the illustrated embodiment, but may be embodied with various changes and modifications, which may occur to those skilled in the art, without departing from the spirit and scope of the invention defined in the appended claims. In the illustrated embodiments, In the illustrated embodiments, the parameter changing portion 37, 237 is configured to change the control parameters at the point of time which is the predetermined delay time prior to the start point of each excessive variation or volume period. However, the parameter changing portion 37, 237 may be configured to change the control parameters at a point of time not prior to the start point of the excessive variation or volume period.

In the illustrated embodiments, the parameter changing portion 37, 237 is configured to calculate the control parameters of the sheet feeding control portion 38 such that the second derivative of the time relating to the drive force for driving the conveyor belt 53 increases with an increase of the amount of variation of the volume of the ink estimated by the variation amount estimating portion 36 or the volume of the ink estimated by the ink-volume estimating portion. However, the parameter changing portion 37, 237 may change the control parameters in any other suitable manner, for instance, such that the drive force for driving the conveyor belt 53 increases with an increase of the estimated amount of variation of the volume of the ink.

In the illustrated first through fourth embodiments, the variation amount estimating portion 36 is configured to estimate the amount of variation of the volume of the ink, by calculating the volume of the ink to be deposited in each of the four divisions A-D of the paper sheet P. However, the variation amount estimating portion 36 may estimate the amount of variation of the volume of the ink, by calculating the volume of the ink to be deposited in the entire area of the paper sheet P or in the subject area X of the paper sheet P In the illustrated first through fourth embodiments, the variation amount estimating portion 36 is configured to estimate the final amount of variation of the volume of the ink during each time period from the point of time tn to the next point of time t(n+1), by multiplying the provisional amount of variation of the volume of the ink of each color by the electric conductivity value of the ink of that color. However, the provisional amount of variation of the volume of the ink estimated by the variation amount estimating portion 36 may be used by the parameter changing portion 37, 237, particularly where the inks of the four colors have substantially the same electric conductivity value. In this case, the arithmetic operation of the variation amount estimating portion 36 can be simplified.

In the illustrated first through fourth embodiments, the parameter changing portion 37, 237 is configured to change the upper limit of the amount of variation of the volume of the ink used to determine the excessive variation period (to determine the start point of time of this excessive variation period), such that the upper limit increases with the increase of the time which has passed after the moment of initiation of the ink droplets from the ink-jet heads 2. However, the upper limit may be a fixed value.

Each of the first and second electrodes 62, 63 may have elongate portions extending in the primary scanning direction such that the elongate portions of the electrode 62 and the elongate portions of the electrode 63 are arranged alternately in the secondary scanning direction. Further, each of at least one of the two electrodes 62, 63 may consist of a plurality of mutually separate portions. It is also noted that one of the two electrodes 62, 63 provided on the sheet attraction platen 60 need not be connected to the ground, as long as the different electric potentials are applied to the respective two electrodes 62, 63. It is possible that a positive potential is applied to one of the two electrodes 62, 63 while a negative potential having the same magnitude is applied to the other electrode.

The control device 16 may be configured to perform a feed-forward control of the drive force of the sheet feeding motor M for rotating the sheet conveyor belt 53.

The principle of the present invention is equally applicable to a liquid ejecting apparatus constructed to eject a liquid other than the ink. Further, the liquid ejecting apparatus of the present invention may be an apparatus other than the printer, for instanced, a facsimile apparatus or a copying apparatus.

What is claimed is:

1. A liquid ejecting apparatus comprising:
   a sheet transfer mechanism including a conveyor belt for feeding a recording medium, and a driving device for driving the conveyor belt, the conveyor belt having a sheet support surface on which the recording medium is placed;
   at least one liquid-ejecting head configured to eject a liquid onto the recording medium being fed by the conveyor belt;
   a medium attraction portion disposed in opposition to a surface of the conveyor belt, which surface is opposite to the sheet support surface, and having a first electrode and a second electrode which are spaced apart from each other in a plane parallel to the sheet support surface and to which respective different electric potentials are applied to generate an attraction force for attracting the recording medium to the sheet support surface of the conveyor belt;
   a memory portion configured to store image data relating to an image to be printed on the recording medium;
   a variation amount estimating portion configured to estimate, during printing of the image on the recording medium and on the basis of the image data stored in the memory portion, an amount of variation of a volume of the liquid to be deposited in a subject area of the recording medium which includes a gap-opposition area opposed to a gap formed between the first and second electrodes; and
   a sheet feeding control portion configured to control the driving device,
   and wherein the sheet feeding control portion changes a drive force of the driving device for driving the conveyor belt, so as to restrict a variation of a feeding speed of the recording medium by the conveyor belt, during an excessive variation period during which the amount of variation of the volume of the liquid estimated by the variation amount estimating portion exceeds a predetermined upper limit.

2. The liquid ejecting apparatus according to claim 1, wherein the sheet feeding control portion changes the drive force of the driving device at a moment of time prior to a start point of the excessive variation period.

3. The liquid ejecting apparatus according to claim 1, wherein the sheet feeding control portion increases a second derivative of a time relating to the drive force of the conveyor belt, with an increase of the amount of variation of the volume of the liquid estimated by the variation amount estimating portion.

4. The liquid ejecting apparatus according to claim 1, wherein the variation amount estimating portion estimates the amount of variation of the volume of the liquid to be deposited in each of a plurality of divisions of the paper sheet successively arranged in a direction of feeding of the paper sheet by the conveyor belt.

5. The liquid ejecting apparatus according to claim 1, wherein the variation amount estimating portion estimates the amount of variation of the volume of the liquid to be deposited in the subject area of the recording medium which exists in only the gap-opposition area opposed to the gap formed between the first and second electrodes.

6. The liquid ejecting apparatus according to claim 1, wherein the at least one liquid-ejecting head ejects a plurality of liquids having respective different values of electric conductivity, and the variation amount estimating portion estimates a sum of the amounts of variation of the volumes of the liquids multiplied by the respective values of the electric conductivity of the liquids.

7. The liquid ejecting apparatus according to claim 1, further comprising a protective film disposed between the first and second electrodes and the conveyor belt and covering the first and second electrodes, and wherein the subject area of the recording medium is an area opposed to the protective film in a direction perpendicular to a plane of the protective film.

8. The liquid ejecting apparatus according to claim 1, wherein the variation amount estimating portion estimates, as the amount of variation of the volume of the liquid, a difference between the volume of the liquid to be deposited in the subject area of the recording medium at one of a plurality of points of time during printing of the image on the recording medium, and the volume of the liquid to be deposited in the subject area at another of the plurality of points of time.

9. The liquid ejecting apparatus according to claim 8, wherein the variation amount estimating portion estimates the amount of variation of the volume of the liquid to be deposited in each of a plurality of divisions of the paper sheet successively arranged in a direction of feeding of the paper sheet by the conveyor belt, and sets the plurality of points of time such that different numbers of the divisions constitute the subject area of the recording medium at two successive ones of the plurality of points of time.

10. The liquid ejecting apparatus according to claim 1, wherein the sheet feeding control portion performs a PID control of the driving device, and changes control parameters of the PID control to change the drive force of the driving device for driving the conveyor belt.

11. The liquid ejecting apparatus according to claim 1, wherein the sheet feeding control portion performs a feed-forward control of the driving device to change the drive force of the driving device for driving the conveyor belt.

12. The liquid ejecting apparatus according to claim 1, further comprising a reversing mechanism configured to turn upside down the recording medium after an image has been printed on one of opposite surfaces of the recording medium, and to place the recording medium again on the conveyor belt of the transfer mechanism so that an image can be printed on the other of the opposite surfaces of the recording medium, and wherein the variation amount estimating portion estimates the amount of variation of the volume of the ink, for only said one of the opposite surfaces of the recording medium where the image is printed on only said one surface, and for both of the opposite surfaces of the recording medium where the images are printed on the other of the opposite surfaces of the recording medium.

13. The liquid ejecting apparatus according to claim 1, wherein the sheet feeding control portion increases the upper limit with an increase of a length of time which has passed after a moment of initiation of ejection of droplets of the liquid from the at least one liquid-ejecting head.

14. The liquid ejecting apparatus according to claim 1, wherein the first electrode has a plurality of first elongate portions extending to pass the at least one liquid-ejecting head in a direction of feeding of the recording medium, and the second electrode has a plurality of second elongate portions extending to pass the at least one liquid-ejecting head in the direction of feeding of the recording medium, the first and second elongate portions being alternately arranged in a direction perpendicular to the direction of feeding of the recording medium.

15. A liquid ejecting apparatus comprising:
- a sheet transfer mechanism including a conveyor belt for feeding a recording medium, and a driving device for driving the conveyor belt, the conveyor belt having a sheet support surface on which the recording medium is placed;
- at least one liquid-ejecting head configured to eject a liquid onto the recording medium being fed by the conveyor belt;
- a medium attraction portion disposed in opposition to a surface of the conveyor belt, which surface is opposite to the sheet support surface, and having a first electrode and a second electrode which are spaced apart from each other in a plane parallel to the sheet support surface and to which respective different electric potentials are applied to generate an attraction force for attracting the recording medium to the sheet support surface of the conveyor belt;
- a memory portion configured to store image data relating to an image to be printed on the recording medium;
- a volume estimating portion configured to estimate, during printing of the image on the recording medium and on the basis of the image data stored in the memory portion, a volume of the liquid to be deposited for each of predetermined time periods, in a subject area of the recording medium which includes a gap-opposition area opposed to a gap formed between the first and second electrodes; and
- a sheet feeding control portion configured to control the driving device,
- and wherein the sheet feeding control portion changes a drive force of the driving device for driving the conveyor belt, so as to restrict a variation of a feeding speed of the recording medium by the conveyor belt, during an excessive volume period during which the volume of the liquid estimated by the volume estimating portion exceeds a predetermined upper limit.

* * * * *